(No Model.)
C. A. PURVIS.
BICYCLE WHEEL.
No. 548,139.                    Patented Oct. 15, 1895.
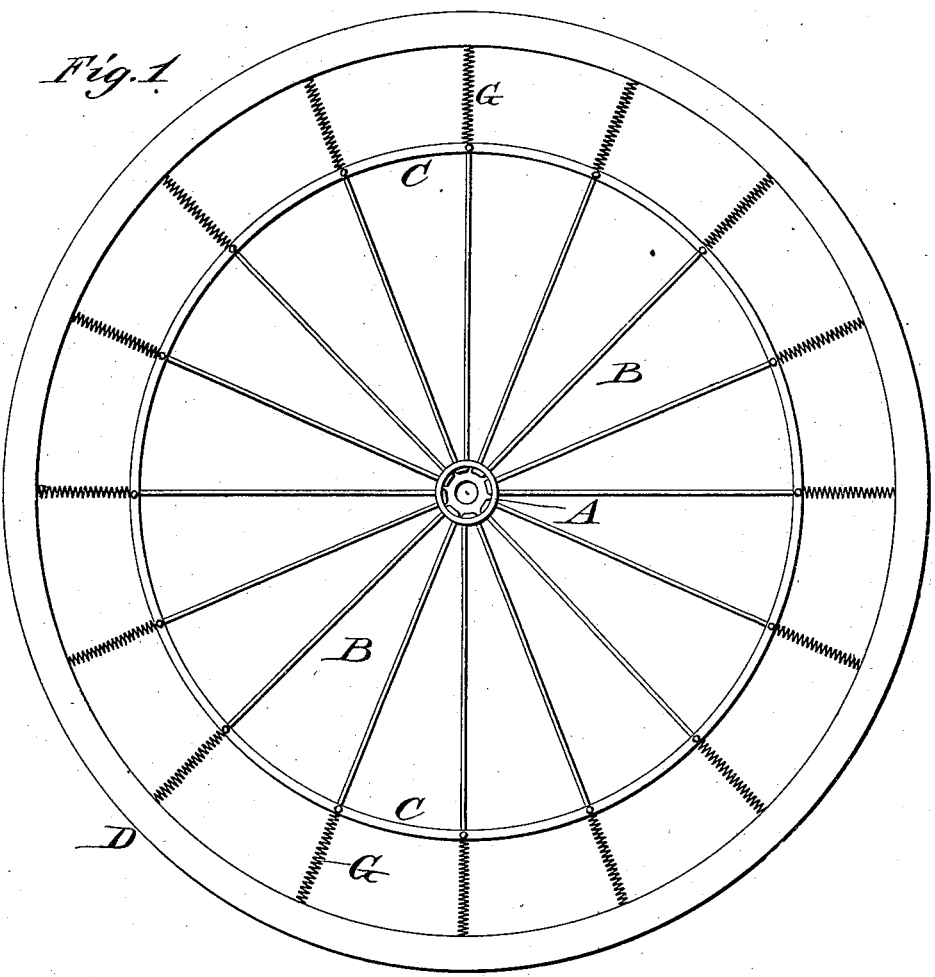
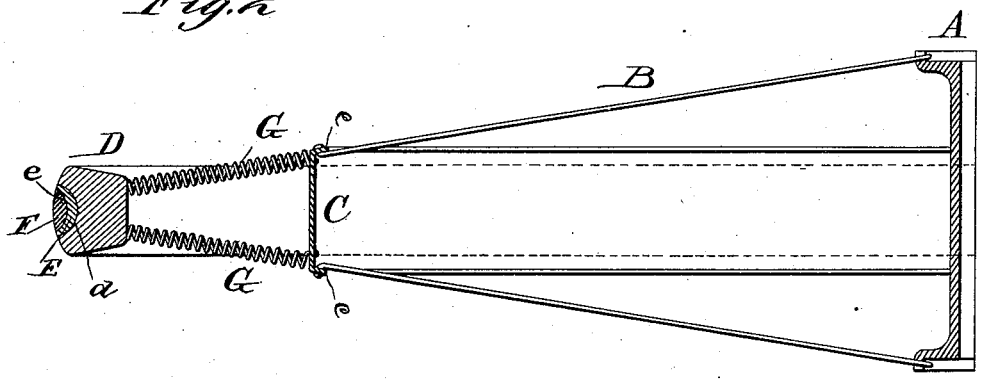

UNITED STATES PATENT OFFICE.

CHARLES A. PURVIS, OF GRAVOIS MILLS, MISSOURI.

BICYCLE-WHEEL.

SPECIFICATION forming part of Letters Patent No. 548,139, dated October 15, 1895.

Application filed June 15, 1895. Serial No. 552,931. (No model.)

*To all whom it may concern:*

Be it known that I, CHARLES A. PURVIS, a citizen of the United States, residing at Gravois Mills, in the county of Morgan, State of Missouri, have invented certain new and useful Improvements in Bicycle-Wheels; and I do hereby declare the following to be a full, clear, and exact description of the invention, such as will enable others skilled in the art to which it appertains to make and use the same.

My invention relates to an improvement in wheels for bicycles and the like vehicles.

The invention will first be described in connection with the accompanying drawings, and then particularly pointed out in the claim.

In the drawings, Figure 1 is an elevation of a wheel embodying my invention. Fig. 2 is a transverse central section of the same.

Referring to the drawings, A is a hub constructed in the usual manner and connected to a series of radiating spokes B, which are in pairs, as shown in Fig. 2, and converge from the hub to the upward projecting sides $c$ of the rim C, to which they are secured in any suitable way, preferably by the ends of the spokes being inserted through the perforations $c'$ in said rim. By this construction the outer ends of the spokes are easily and effectually secured to the inner rim, and at the same time the rim is materially strengthened and less liable to injury or fracture. Furthermore, the outer periphery of the said rim presents a flat surface for the attachment and bearing of the springs.

Surrounding the rim C is an outer tread-rim D, preferably of wood and convex on its outer surface, which has a central convexity, as shown at $d$. On this outer surface is placed an iron or steel tire E, which fits closely to the rim and has also a depression $e$, into which is inserted a leather or rubber band F, to render the wheel noiseless.

Between the tread-rim D and the inner rim C are placed a series of pairs of spiral springs G, which are each suitably connected at one end to the outer or tread rim D, and at the other end to the inner rim C, the springs converging from the inner rim to the outer rim, which is preferably narrower than said inner rim.

By my construction the spiral springs expand on the upper side and contract on the lower side when loaded, thereby serving to break the shocks and jars, which would otherwise be transmitted to the load, while at the same time the converging arrangement of said springs serves to prevent undue lateral motion or wabbling of the outer rim.

Having thus fully described my invention, what I claim as new, and desire to secure by Letters Patent, is—

In a wheel, the combination, with an inner wheel having a hub, a series of spokes radiating therefrom and secured at their outer ends in perforations in the upward-projecting sides of the inner rim, of a series of pairs of radially arranged spiral springs secured on opposite sides to the outer periphery of the inner rim and converging toward each other at their outer ends and connected to the outer tread rim, as and for the purpose described.

In testimony whereof I affix my signature in presence of two witnesses.

CHARLES A. PURVIS.

Witnesses:
   B. R. RICHARDSON,
   LEWIS LUMSEE.